US007218429B2

(12) United States Patent
Batchko

(10) Patent No.: US 7,218,429 B2
(45) Date of Patent: May 15, 2007

(54) DIGITAL FOCUS LENS SYSTEM

(76) Inventor: Robert G. Batchko, 46 Calhoun Ter., San Francisco, CA (US) 94133

( * ) Notice: Subject to any disclaimer, the term of this patent is extended or adjusted under 35 U.S.C. 154(b) by 0 days.

(21) Appl. No.: 11/333,817

(22) Filed: Jan. 17, 2006

(65) Prior Publication Data

US 2006/0114534 A1    Jun. 1, 2006

Related U.S. Application Data

(63) Continuation of application No. 10/617,572, filed on Jul. 11, 2003, now Pat. No. 7,072,086, and a continuation-in-part of application No. 10/029,399, filed on Oct. 19, 2001.

(60) Provisional application No. 60/395,849, filed on Jul. 11, 2002, provisional application No. 60/242,395, filed on Oct. 20, 2000.

(51) Int. Cl.
  *G02B 5/32* (2006.01)

(52) U.S. Cl. .................... 359/15; 359/19; 349/200

(58) Field of Classification Search ............. 359/15, 359/19, 380, 432; 349/200–202
See application file for complete search history.

(56) References Cited

U.S. PATENT DOCUMENTS

| 3,970,361 | A | 7/1976 | Di Matteo et al. ........... 359/478 |
| 4,130,832 | A | 12/1978 | Sher ............................ 348/44 |
| 4,764,890 | A | 8/1988 | Hinton ........................ 364/807 |
| 4,799,103 | A | 1/1989 | Muckerheide ............... 348/51 |
| 4,834,473 | A | 5/1989 | Keyes, IV et al. ............. 359/1 |
| 4,989,958 | A | 2/1991 | Hamada et al. ............. 350/419 |
| 5,071,229 | A | 12/1991 | Oaki et al. ..................... 359/53 |
| 5,148,310 | A | 9/1992 | Batchko ...................... 359/479 |
| 5,150,234 | A | 9/1992 | Takahashi et al. ............ 359/65 |
| 5,630,004 | A | 5/1997 | Deacon et al. .............. 385/129 |
| 5,712,721 | A | 1/1998 | Large ......................... 359/245 |

(Continued)

FOREIGN PATENT DOCUMENTS

GB        2171535      *  8/1986

(Continued)

OTHER PUBLICATIONS

International Preliminary Examination Report of International Application PCT/US01/50750.

(Continued)

*Primary Examiner*—Leonidas Boutsikaris
(74) *Attorney, Agent, or Firm*—Joshua D. Isenberg; JDI Patent

(57)    ABSTRACT

A digital focus lens systems that can provide an optical system with a plurality of selectable focal powers is described. The system includes a number of switchable elements, each of which is capable of being switched between a first state and a second state, whereby the states represent unique focal powers. The switchable elements may be arranged coaxially in a stack such that each of them may contribute to a cumulative focal power of the system. If, for example, the system includes two such switchable elements, four focal powers for the lens system may be selected by appropriate choice the states of each switchable element. Digital telescopes, cameras, microscopes, and other optical instruments may be implemented using such digital focus lens systems. Methods of fabricating switchable elements and methods of controlling digital lens systems are also disclosed.

23 Claims, 9 Drawing Sheets

U.S. PATENT DOCUMENTS

| | | |
|---|---|---|
| 5,751,452 A | 5/1998 | Tanaka et al. ............... 359/52 |
| 5,751,471 A | 5/1998 | Chen et al. ................. 359/319 |
| 5,764,317 A | 6/1998 | Sadovnik et al. ............. 349/5 |
| 5,768,242 A | 6/1998 | Juday ......................... 369/103 |
| 5,920,427 A * | 7/1999 | Ogata ......................... 359/432 |
| 5,936,767 A | 8/1999 | Favalora ..................... 359/462 |
| 5,942,157 A | 8/1999 | Sutherland et al. ......... 252/582 |
| 5,990,990 A | 11/1999 | Crabtree ..................... 349/74 |
| 6,100,862 A | 8/2000 | Sullivan ..................... 345/88 |
| 6,115,151 A | 9/2000 | Popovich ..................... 359/9 |
| 6,178,020 B1 | 1/2001 | Schultz et al. ............. 359/107 |
| 6,183,088 B1 | 2/2001 | LoRe .......................... 353/7 |
| 6,185,016 B1 | 2/2001 | Popovich ..................... 359/15 |
| 6,211,976 B1 | 4/2001 | Popovich et al. ............ 359/15 |
| 6,295,145 B1 | 9/2001 | Popovich ..................... 359/15 |
| 6,304,263 B1 | 10/2001 | Chiabrera et al. ......... 345/419 |
| 6,317,190 B1 | 11/2001 | Winarski et al. ........... 349/200 |
| 6,320,635 B1 | 11/2001 | Matsui ........................ 349/133 |
| 6,323,970 B1 | 11/2001 | Popovich ..................... 359/4 |
| 6,329,963 B1 | 12/2001 | Chiabrera et al. ............ 345/6 |
| 6,356,366 B1 * | 3/2002 | Popovich ..................... 359/15 |
| 6,359,674 B1 | 3/2002 | Horiuchi ..................... 349/200 |
| 6,377,229 B1 | 4/2002 | Sullivan ..................... 345/6 |
| 2002/0158866 A1 | 10/2002 | Batchko ...................... 345/419 |
| 2004/0114203 A1 | 6/2004 | Batchko ...................... 359/3 |

FOREIGN PATENT DOCUMENTS

WO     WO 02/033657 A3     4/2002

OTHER PUBLICATIONS

L. Vicari, "Liquid-Crystal Layer Between Rough Polymeric Surfaces", Journal of the Optical Society of America B, vol. 16, No. 7, Jul. 1999.

* cited by examiner

DIGITAL FOCUS LENS SYSTEM

This application is a continuation of U.S. patent application Ser. No. 10/617,572, filed Jul. 11, 2003, now U.S. Pat. No. 7,072,086, and published as U.S. Patent Application Publication 2004/0114203 A1, the entire disclosures of which are incorporated herein by reference. Application Ser. No. 10/617,572 claims the benefit of U.S. Provisional Patent Application No. 60/395,849 filed Jul. 11, 2002, the entire disclosures of which are incorporated herein by reference. This application is also a continuation-in-part of co-pending U.S. patent application Ser. No. 10/029,399 filed Oct. 19, 2001 and published as U.S. Patent Application Publication 2002/0158866 A1, the entire contents of which are incorporated herein by reference. Application Ser. No. 10/029,399 claims the benefit of US Provisional Application 60/242,395 filed Oct. 20, 2000, the entire disclosures of which are incorporated herein by reference. This application claims the benefit of priority of application Ser. Nos. 10/617,572, 10/029,399, 60/395,849, and 60/242,395.

FIELD OF THE INVENTION

This invention relates to optical components such as optical lens complexes and more specifically, to variable-focus lenses such as liquid crystal lenses.

BACKGROUND OF THE INVENTION

Solid-state variable-focus lens systems are needed in a variety of applications such as in cameras deployed on aircraft and subjected to strong acceleration forces. It is often desirable to have a variable-focus lens system that is compact and capable of solid-state operation; and further, one in which the number of possible states of focusing is an exponential function of the number of optical elements in the system. Conventional variable-focus lens systems are bulky, require moving parts, or require numerous elements resulting in optical losses and aberration of the images.

Thus, there is a need in the art, for a lens system that overcomes the above disadvantages.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the embodiments of the invention described below are set forth without any loss of generality to, and without imposing limitations upon, the claimed invention.

According to an embodiment of the present invention digital focus lens system may include a stack of switchable lens elements. The stack may include a plurality of optically transparent substrates symmetrically spaced apart, optically transparent electrodes deposited on the surfaces of each substrate, polymer layers deposited on the electrodes, and liquid crystal (LC) layers filling the gaps between adjacent pairs of polymer layers. Each polymer layer may be spatially patterned to provide a selected lens function having a selected focal length, and each is treated with alignment features to facilitate orientation of the LC monomers. When a selected voltage is applied across adjacent pairs of electrodes, the refractive index of the LC layer positioned between those electrodes is switched to a selected value and the focal lengths of the polymer layers adjacent to the LC layer are modulated. Thus, each group of electrode-polymer-LC-polymer-electrode layers may constitute a different switchable lens element where each can be switched between a first state, having a first focal length, and a second state, having a second focal length.

A control signal may be provided for selecting the states of the switchable lens elements. For a stack of N switchable lens elements, the control signal will include a digital word comprised of at least N bits. The control signal is demultiplexed and each bit used to modulate the voltage applied to a corresponding switchable lens element. The state of each switchable lens element is thus controlled by a corresponding bit of the digital word.

The switchable lens elements can be stacked coaxially and can be switched independently to either state. Thus, the system has a focal length that is determined by the instantaneous combination of states of the switchable lens elements. In the first state, the switchable lens elements may have identical focal lengths. In the second state, the focal lengths of the switchable lens elements increase, following a progression, similar to binary weighting, in which the focal length of each sequential switchable lens element in the stack increases by a factor of 2 from that of the previous element. For a system comprising a stack of N switchable lens elements, the focal length can be selected from a set of at least $2^N$ values. The system thus has a focal power that is a function of the digital word contained in the control signal.

Figure 1:
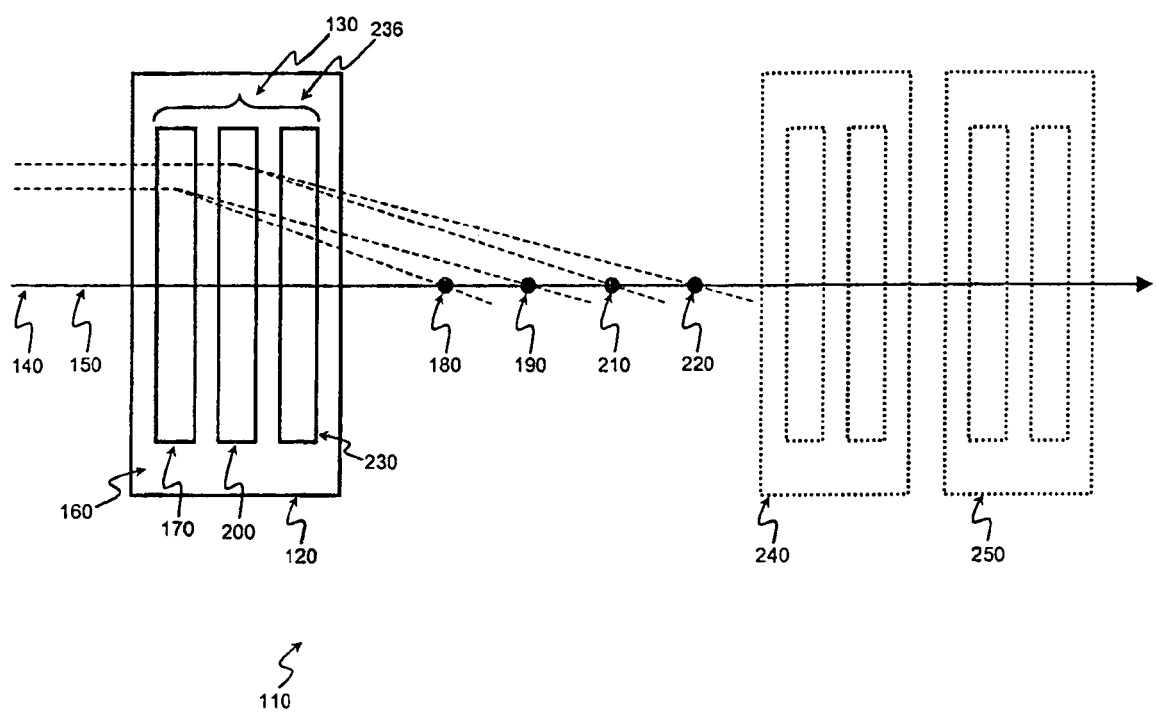
FIG. 1 shows a digital focus lens system according to an embodiment of the present invention.

Referring now to FIG. 1, a digital focus lens system according to an embodiment of the present invention is shown and indicated generally at 110. System 110 employs a first optical module, $M_1$ (first module) 120. First module 120 incorporates a number of optical elements (elements) indicated schematically at 130. The individual elements 130 in the module 140 are in optical communication with each other such that each element 130 in the module 140 may contribute to a cumulative optical affect. For example, the elements 130 may be oriented such that the optical axes 140 of elements 130 are generally collinear with the optical axis 150 of the system 110. Some or all of elements 130 may be positioned in close proximity to adjacent elements. In this fashion, the elements in first module 120 may form a first stack of elements (first stack) 160. One or more of Elements 130 may be similar to thin lenses whereby the standard thin lens approximation formulas may be applicable to portions of first stack 160 and/or first module 120. First module 120 and/or first stack 160 may also be considered similar to a "lens group", or to a "lens complex," terms commonly used in the field of lens design.

At least one of elements 130 includes a first switchable element 170. First switchable element 170 may be activated between a number of unique states, where for each state, first switchable element 170 is capable of performing a unique optical transform (or filter function). Preferably, first switchable element 170 may be activated between two states, however, in general, any number of states may be utilized by first switchable element 170. Preferably, the transform performed by first switchable element 170 is similar to that of a thin lens. For example, first switchable element 170 may be activated into a first-switchable-element first-state (FSE 0-state), having the property of an FSE 0-state focal length 180. Similarly, first switchable element 170 may be activated into a first-switchable-element second-state (FSE 1-state) having an FSE 1-state focal length 190. First Module 120 may also incorporate a second switchable element 200. Second switchable element 200 may be activated into a second-switchable-element first-state (SSE 0-state), having the property of an SSE 0-state focal length 210. Similarly, second switchable element 200 may be activated into a second-switchable-element second-state (SSE 1-state) having an SSE 1-state focal length 220. In this fashion, First Module 120 may also incorporate additional switchable elements 230. In this fashion, first module 120 may incorporate a number of switchable elements, N, indicated generally at 236 whereby each switchable element may be activated between a first state (0-state) and a second state (1-state) corresponding to a first focal length and a second focal length, respectively. Examples of switchable elements 170, 200 include without limitation liquid crystals (LCs), holographic optical elements, polymer-dispersed liquid crystals, nonlinear optical lenses, electro-optic elements, electro-optic lenses, LC lenses, LC prisms, LC gratings, LC shutters, LC aperture stops, LC irises, polymer dispersed liquid crystals, switchable holographic optical elements (HOEs), polarization rotators, isotropic, uniaxial, biaxial and/or other anisotropic optical materials, deformable mirrors and deformable gratings, and micro-electro-mechanical systems (MEMS) and MEMS mirrors. Similarly, a second module 240 and third module 250, and in general, any number of additional modules (not shown), may be incorporated in system 110.

Figure 2:
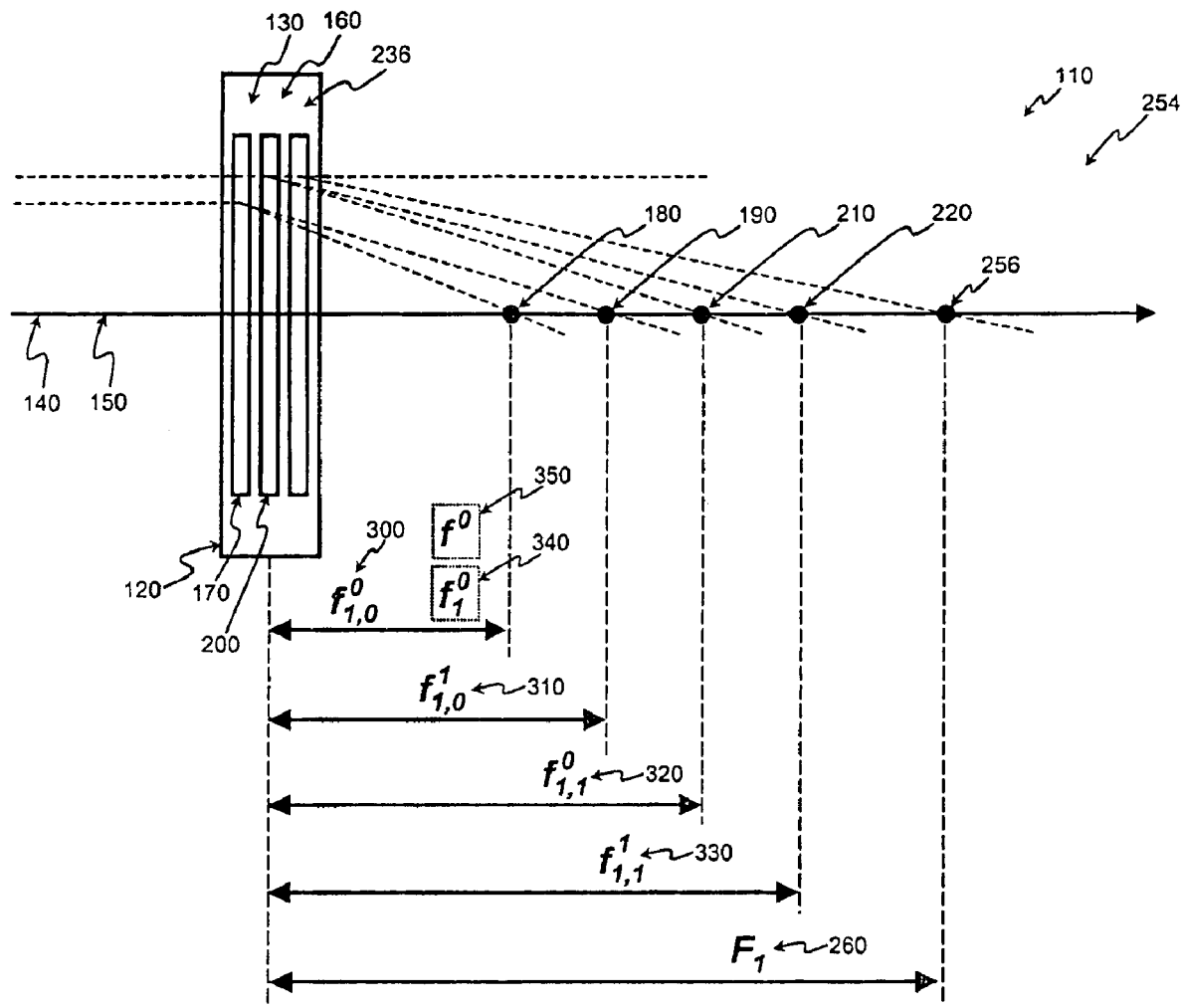
FIG. 2 shows another view of a digital focus lens system.

Turning now to FIG. 2, a further description of the optical properties of a digital focus lens system according to an embodiment of the present invention is shown and indicated generally at 254. The same components as in FIG. 1 have the same assigned number as in FIG. 1. System 110 includes a first module 120. First module 120 includes a first stack 160. First stack 160 includes a number of elements 130. One or more of elements 130 comprise a number of switchable elements, N, 236. For the purpose of the indexing the N switchable elements 236, each switchable element may be assigned a unique subscript number n, where n may be chosen from the set:

$$n \in \{0, 1 \ldots N-1\}. \qquad \text{Eq. 1}$$

Each switchable element n may be switched between two specified states, however, in general, any number of states may be specified.

An impulse (or "state") variable, $\delta_{m,n}(\text{state})$, can be defined as corresponding to the state of switchable element n in module m where $$\delta_{m,n}(\text{state}) = \begin{cases} 0 & 0-\text{state} \\ 1 & 1-\text{state} \end{cases}. \qquad \text{Eq. 2}$$

For the remainder of this discussion, the parenthesis (state) will be dropped from the symbol $\delta_{m,n}$ for simplification. It follows that a $\delta_{m,n}$ will be specified for each switchable element n in module m. Also, it will be seen that $\delta_{m,n}$ is similar to delta functions commonly used in the field of Fourier analysis.

By way of example, $\delta_{1,0}$, corresponding to the state of switchable element 0 in module 1, may have the value $\delta_{m,n}=0$ while the 0th element is activated in the 0-state, and the value 1 while activated in 1-state. Now, a switchable element focal length variable, $f_{m,n}^{\delta_{m,n}}$ is given to specify the focal length of switchable element n in module m. The parameters of $f_{m,n}^{\delta_{m,n}}$ are: a first subscript m specifying the module number; a second subscript n specifying the switchable element number and a superscript $\delta_{m,n}$ specifying the state of the nth element in module m. It follows that a variable $f_{m,n}^{\delta_{m,n}}$ will be specified for each switchable element n in each module m. As illustrated in FIG. 2, the 0-state and 1-state switchable element focal lengths of switchable element n=2 in module m=1 are identified by $f_{1,2}^{0}$ and $f_{1,2}^{1}$, respectively. As a further example of this nomenclature, the 0-state focal length of the first switchable element 170 in the first module 120 will be referred to by the symbol $f_{1,0}^{0}$ 300. The 1-state focal length of the first switchable element 170 in the first module 120 will be referred to by the symbol $f_{1,0}^{1}$ 310. Similarly, the 0-state focal length of the second switchable element 200 in the first module 120 will be referred to by the symbol $f_{1,1}^{0}$ 320. As a final example of the nomenclature, the 1-state focal length of the second switchable element 200 in the first module 120 will be referred to by the symbol $f_{1,1}^{1}$ 330. Next, a module focal length, $F_m$, 256 is given for the focal length of a module where the module number is indicated by the subscript m. For example, $F_1$ 260 is the symbol for the module focal length 256 of the first module 120, m=1. From the above discussion, it follows that, for the case of the switchable elements being approximated as a stack of thin lenses (such when each element can be approximated as a thin lens and each is in approximate contact with any adjacent elements) and the paraxial approximation applies to the stack, the module focal length, $F_m$, can be expressed as $$F_m = \left( \sum_{n=0}^{N-1} \left( \frac{\delta_{m,n}}{f_{m,n}^1} + \frac{1-\delta_{m,n}}{f_{m,n}^0} \right) \right)^{-1}. \qquad \text{Eq. 3}$$

Eq. 3 can be rearranged as $$F_m = \left[ \left( \sum_{n=0}^{N-1} \frac{1}{f_{m,n}^0} \right) + \sum_{n=0}^{N-1} \delta_{m,n} \left( \frac{1}{f_{m,n}^1} - \frac{1}{f_{m,n}^0} \right) \right]^{-1}. \qquad \text{Eq. 4}$$

In one embodiment of the invention, the N switchable elements in module m may be constructed such that their 1-state focal lengths, $f_{m,n}^1$, follow the mathematical form $$f_{m,n}^1 = \left(\frac{2^n}{\Delta_m} + \frac{1}{f_{m,n}^0}\right)^{-1} \quad \text{Eq. 5}$$

where $\Delta_m$ is a constant for module m, is independent of n, and has the dimension of length. Generally, however, in other embodiments of the invention, $f_{m,n}^1$ may be expressed by other mathematical forms.

Substituting Eq. 5 into Eq. 4 gives $$F_m = \left[\left(\sum_{n=0}^{N-1}\frac{1}{f_{m,n}^0}\right) + \frac{1}{\Delta_m}\sum_{n=0}^{N-1}\delta_{m,n}2^n\right]^{-1}. \quad \text{Eq. 6}$$

Now it can be seen that the second summand term in Eq. 6 will have a unique value for each possible combination of states $\delta_{m,n}$ for the N switchable elements 236 in module m.

Neglecting the $1/\Delta_m$ factor in front of the summand term of Eq. 6, the combination of possible values for the summand define the set of integers $$\sum_{n=0}^{N-1}\xi_n 2^n \in \{0, 1\ldots 2^N - 1\}. \quad \text{Eq. 7}$$

The summand of Eq. 7 can be replaced with a dimensionless indexing variable, k, where k represents any value of the set of integers corresponding to the $2^N$ possible combinations of states for the N switchable elements in module m. Substituting Eq. 8 into Eq. 6 gives $$F_m(k)|_{k=0,1\ldots 2^N-1} = \left(\frac{k}{\Delta_m} + \sum_{n=0}^{N-1}\frac{1}{f_{m,n}^0}\right)^{-1}. \quad \text{Eq. 9}$$

Further, substituting Eq. 8 into Eq. 9 gives an expanded form for the module focal length $$F_m \in \left\{\left(\sum_{n=0}^{N-1}\frac{1}{f_{m,n}^0}\right)^{-1}, \left(\frac{1}{\Delta_m} + \sum_{n=0}^{N-1}\frac{1}{f_{m,n}^0}\right)^{-1},\right. \quad \text{Eq. 10}$$

$$\left.\left(\frac{2}{\Delta_m} + \sum_{n=0}^{N-1}\frac{1}{f_{m,n}^0}\right)^{-1}\ldots\left(\frac{(2^N-1)}{\Delta_m} + \sum_{n=0}^{N-1}\frac{1}{f_{m,n}^0}\right)^{-1}\right\}.$$

From Eq. 10 it can be seen that $F_m$, the effective module focal length for module m, may consist of a set of $2^N$ unique focal lengths.

In one embodiment, the 0-state focal lengths of all N switchable elements 236 within the same module may be identical. For this case $f_{m,n}^0$ will be constant for all values of n. Therefore, in the current embodiment, the 0-state focal lengths of all N switchable elements 236 may be expressed in the shortened form $$f_{m,n}^0 = f_m^0 \quad \text{Eq. 11}$$

where the second subscript, n, has been dropped for simplicity due to the fact that the 0-state focal length is now independent of the value of n. Generally, however, as described above, the 0-state focal length of the N switchable elements 236 within a module may have any value.

Substituting Eq. 11 into Eqs. 9 and 10 gives simplified forms for $F_m$ $$F_m(k)|_{k=0,1\ldots 2^N-1} = \left(\frac{N}{f_m^0} + \frac{k}{\Delta_m}\right)^{-1}, \quad \text{Eq. 12}$$

and in expanded form $$F_m \in \quad \text{Eq. 13}$$

$$\left\{\left(\frac{N}{f_m^0}\right)^{-1}, \left(\frac{1}{\Delta_m} + \frac{N}{f_m^0}\right)^{-1}, \left(\frac{2}{\Delta_m} + \frac{N}{f_m^0}\right)^{-1}\ldots\left(\frac{(2^N-1)}{\Delta_m} + \frac{N}{f_m^0}\right)^{-1}\right\}.$$

A module focal power for module m may be introduced as $$P_m = F_m^{-1}. \quad \text{Eq. 14}$$

Substituting Eq. 14 into Eqs. 12 and 13 gives $$P_m(k)|_{k=0,1\ldots 2^N-1} = \frac{N}{f_m^0} + \frac{k}{\Delta_m} \quad \text{Eq. 15}$$

and in expanded form $$P_m \in \left\{\left(\frac{N}{f_m^0}\right), \left(\frac{1}{\Delta_m} + \frac{N}{f_m^0}\right), \left(\frac{2}{\Delta_m} + \frac{N}{f_m^0}\right)\ldots\left(\frac{(2^N-1)}{\Delta_m} + \frac{N}{f_m^0}\right)\right\}. \quad \text{Eq. 16}$$

From Eqs. 12 and 15 it can be seen that $F_m$ and $P_m$ (where k has been dropped from both functions for simplicity) are functions of the indexing variable k. It thus follows from these equations, and from Eqs. 13 and 16, that the module focal length $F_m$, and module focal power $P_m$, of module m are selectable from a set of $2^N$ focal lengths for the switchable elements. It also follows that each focal length (or focal power) corresponds to a unique combination of states for the N switchable elements in module m. In this sense, module m is capable of performing a "quantized zoom" function in that its module focal length (or focal power) may be varied between a number of quantized focal lengths (or focal powers). The addition of other optical elements, such as conventional lenses, in the module will affect the $F_m$ and $P_m$ in a fashion that will be understood by those skilled in the art.

In another embodiment of the invention the 0-state focal length of each of the N switchable elements in module m may be fixed at a distance of infinity, $$f_m^0 = \infty \text{ mm}. \qquad \text{Eq. 17}$$

Substituting Eq. 17 into Eqs. 12, 13 and 16 gives the following expressions for module focal length and module focal power. For the focal length, $$F_m(k)|_{k=0,1...2^N-1} = \frac{\Delta_m}{k}, \qquad \text{Eq. 18}$$

and in expanded form $$F_m \in \left\{ \frac{\Delta_m}{0}, \frac{\Delta_m}{1}, \frac{\Delta_m}{2} \cdots \frac{\Delta_m}{2^N-1} \right\}; \qquad \text{Eq. 19}$$

and, in terms of focal power $$P_m(k)|_{k=0,1...2^N-1} = \frac{k}{\Delta_m}, \qquad \text{Eq. 20}$$

and in expanded form $$P_m \in \left\{ \left(\frac{0}{\Delta_m}\right), \left(\frac{1}{\Delta_m}\right), \left(\frac{2}{\Delta_m}\right) \cdots \left(\frac{(2^N-1)}{\Delta_m}\right) \right\}. \qquad \text{Eq. 21}$$

Figure 3:
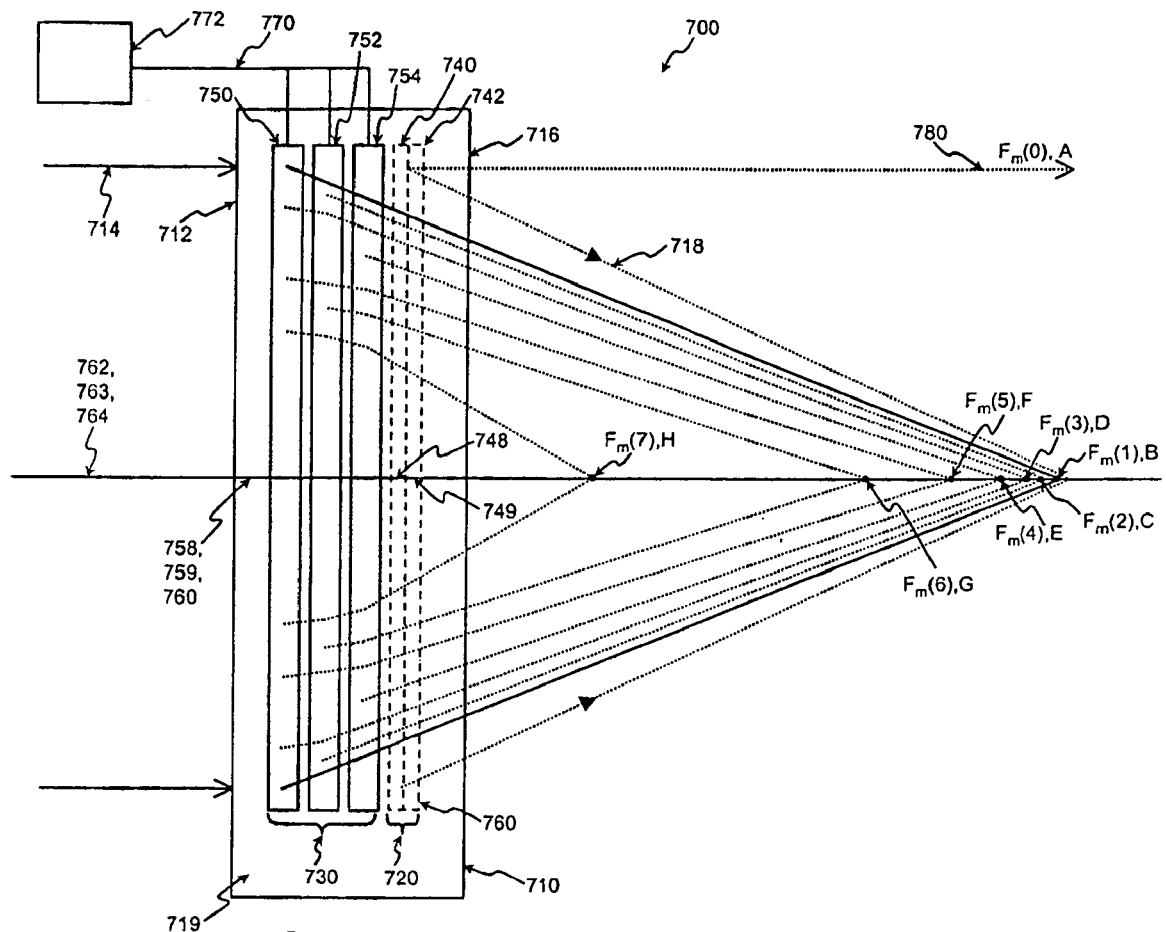
FIG. 3 shows yet another view of a digital focus lens system.

Referring now to FIG. 3, a digital focus lens system according to another embodiment of the present invention is shown and indicated generally at 700. Lens system 700 includes an optical module 710. Although only a single module 710 is shown in the figure, any number of modules may be incorporated in the system 700. Module 710 has an input face 712 for receiving input light generally indicated by 714 directed into module 710. Light 714 may be coherent or incoherent, and may originate from light sources including without limitation, light emitting diodes (LEDs), spatial light modulators, scanners, lasers, light bulbs, natural lighting (for example, sunlight), images (such as those generated by such LED or liquid crystal arrays or other optical systems such as telescopes, displays or microscopes). Similarly, module 710 has an output face 716 for emitting output light generally indicated at 718 which has been transmitted through module 710. Module 710 comprises an optical element stack 719. Stack 719 includes a number of optical elements, preferably in generally close proximity and orientation to one another such that the standard analytic approximations well known in the field of optics may apply. Such approximations include without limitation, thin lens and paraxial approximations.

Stack 719 may comprise a first sub-stack 720. First sub-stack 720 may comprise a number of non-switchable elements 740, 742. While only two non-switchable elements 740, 742 are shown in FIG. 3, any number of non-switchable elements may be incorporated. Preferably, each of the non-switchable elements 740, 742 comprises a number of optical elements which are capable of performing the functions of a thin lens, however, any refractive, diffractive, reflective or other conventional optical elements for the modulation of phase, frequency and/or amplitude of electromagnetic radiation may be employed. For example, non-switchable elements 740, 742 may include without limitation, mirrors, lenses, diffraction gratings, prisms, polarizers, faraday rotators, biaxial crystals, optical films and coatings, optical gain media, nonlinear optical materials, spatial filters, wavelength-selective filters, holographic optical elements, or other conventional on-axis or off-axis optical elements. Preferably, each of the non-switchable elements 740, 742 are capable of performing phase modulation functions similar to that of a lens, and will have a specific F#, optical axis 748, 749, and focal length. Some or all of the focal lengths of non-switchable elements 740, 742 may be identical or unique from the others. Preferably, the optical axes 748, 749 are collinear. Alternatively, non-switchable elements 740, 742 may comprise a single non-switchable element 760.

Lens stack 719 may further comprise a second sub-stack 730. Second sub-stack 730 may comprise a stack of switchable elements, indicated at 750, 752, 754. While only three switchable elements 750, 752, 754 are shown, any number of switchable elements may be incorporated. Preferably, each switchable element 750, 752, 754 comprises a variable focal length- or switchable-lens, however, any switchable refractive, diffractive, reflective or other optical elements for the modulation of phase, frequency and/or amplitude of electromagnetic radiation may be employed. As discussed previously, examples of switchable elements include without limitation liquid crystals (LCs), holographic optical elements, polymer-dispersed liquid crystals, nonlinear optical lenses, electro-optic elements, electro-optic lenses, LC lenses, LC prisms, LC gratings, LC shutters, LC aperture stops, LC irises, polymer dispersed liquid crystals, switchable holographic optical elements (HOEs), polarization rotators, isotropic, uniaxial, biaxial and/or other anisotropic optical materials, deformable mirrors and deformable gratings, and micro-electro-mechanical systems (MEMS) and MEMS mirrors. The number of switchable elements 750, 752, 754 and the number of non-switchable elements 740, 742 may be identical or different. Preferably, each of the switchable elements 750, 752, 754 are capable of performing phase modulation functions similar to that of a number of lenses, and will have specific F#'s, optical axes, and focal lengths. Each of the switchable elements 750, 752, 754 may be switched between at least a specific first state ("0-state") and a specific second state ("1-state").

While only two states (0-state and 1-state) are discussed here for each of switchable elements 750, 752, 754, any number of states may be employed. Preferably, for each of the switchable elements 750, 752, 754 the 0-state corresponds to a specific first focal length (0-state focal length) having a 0-state optical axis 758, 759, 760 and 0-state F#. Likewise, for each of the switchable elements 750, 752, 754 the 1-state corresponds to and a specific second focal length (1-state focal length) having a 1-state optical axis 762, 763, 764 and a 1-state F#. Preferably, the 0-state focal lengths for the switchable elements 750, 752, 754 are identical and at a distance of infinity. However, any 0-state focal lengths may be employed by switchable elements 750, 752, 754. Each of the switchable elements 750, 752, 754 will preferably have a specific F#, optical axis 758, and focal length for each of the 0-states and 1-states. Preferably, 1-state focal length for each of switchable elements 750, 752, 754 will be unique and will follow the relation similar to that described in Eq. 5 above. Preferably, the optical axes 748, 749, 758, 759, 760, 762, 763, 764 are collinear. Preferably, first sub-stack 720 and second sub-stack 730 are preferably of nominal thickness and in close contact with one another such that approximations, well known in the field of optics, including without limitation the thin-lens-close-contact approximations may apply to elements in both stacks 720, 730. Preferably, switchable elements 750, 752, 754 may be activated in any combination of 1-states and 0-states simultaneously. In this fashion, module 710 may have a module focal length generally corresponding to the inverse of the sum of inverse focal lengths of switchable elements 750, 752, 754. It also follows that the module focal length will be selectable from a prescribed set of possible values. Preferably, the module focal length will follow relations similar to those described in Eqs. 3, 4, 6, 9, 10, 12, 13, 18 and 19 above.

Switchable elements 750, 752, 754 are connected to control cable 770. Control cable 770 connects to controller 772 which provides energy (such as voltage, current, or charge) and control signals for activating and selecting the states of switchable elements 750, 752, 754. Preferably, each of switchable elements 750, 752, 754 are fabricated and arranged such that each of the 1-state focal lengths serves to focus light 718 at a corresponding focal point which is at a unique distance from output face 716. When input light 714 is generally collimated, or originates from a light source an approximately infinite distance from input face 712, output light 718 will be focused at a point located at a distance from output face 716 approximately equal to the module focal length.

The following examples will use the previously discussed notation $F_m(k)$ to describe the module focal length; the subscript m indicates the module number, and the number "k" in parentheses specifies the index number for the module focal length that has been selected from the set of possible values (see Eqs. 8, 9, 10, 12, 13, 18 and 19, above). For example, in the preferred embodiment, when all elements 750, 752, 754 are activated in the 0-states, module 710 will have a module focal length $F_m(0)$ and the transmitted light may be focused at a point A located a generally infinite distance from output face 716 and indicated by ray 780.

Alternatively, however, system 700 may be configured such that point A is located at a finite distance from output face 716. When element 750 is in the 1-state and elements 752, 754 are in the 0-states, the module focal length will correspond to $F_m(1)$ and light 718 may be focused at a point B. When element 752 is in the 1-state and elements 750, 754 are in the 0-states, the module focal length will correspond to $F_m(2)$ and light 718 may be focused at a point C. When elements 750, 752 are in the 1-states and element 754 is in the 0-state, the module focal length will correspond to $F_m(3)$ and light 718 may be focused at a point D. When element 754 is in the 1-state, and elements 752, 754 are in the 0-states, the module focal length will correspond to $F_m(4)$ and light 718 may be focused at a point E. When elements 750, 754 are in the 1-states and element 752 is in the 0-state, the module focal length will correspond to $F_m(5)$ and light 718 may be focused at a point F. When elements 752, 754 are in the 1-states and element 750 is in the 0-state, the module focal length will correspond to $F_m(6)$ and light 718 may be focused at a point G.

Finally, when all elements 750, 752, 754 are activated in the 1-states and no elements are in the 0-states, the module focal length will correspond to $F_m(7)$ and light 718 may be focused at a point H. Controller 772 may also provide signals such that any portion of switchable elements 750, 752, 754 are activated simultaneously in any combination of states. In this fashion, elements 750, 752, 754 may perform any combination of 0-state and 1-state optical functions simultaneously. Further, the relative portions of light 714, 718 that is modified by 0-states and 1-states of elements 750, 752, 754 may be determined by controller 772. In this fashion, the module 710 may simultaneously have a plurality of module focal lengths and light 718 may be focused simultaneously at combinations of points A, B, C, D, E, F, G, and H. The module focal length can also be expressed in terms of a module focal power, $P_m(k)$, similar to the relationships described in Eqs. 14, 15, 16, 20, 21 above.

The module focal power, $P_m(k)$, may be selected from a set of values that are determined by the combination of states of elements 750, 752, 754. The possible values for $P_m(k)$ comprise a sequence of values, similar to the relation described in Eq. 20; in this fashion, the value (or, "state") of the module focal power is a linear function of the value of k. It follows from this that, since k is a value (or "state") indicating the combination of states of the switchable elements, the module focal power is thus a function of the combination of states of the switchable elements.

Figure 4:
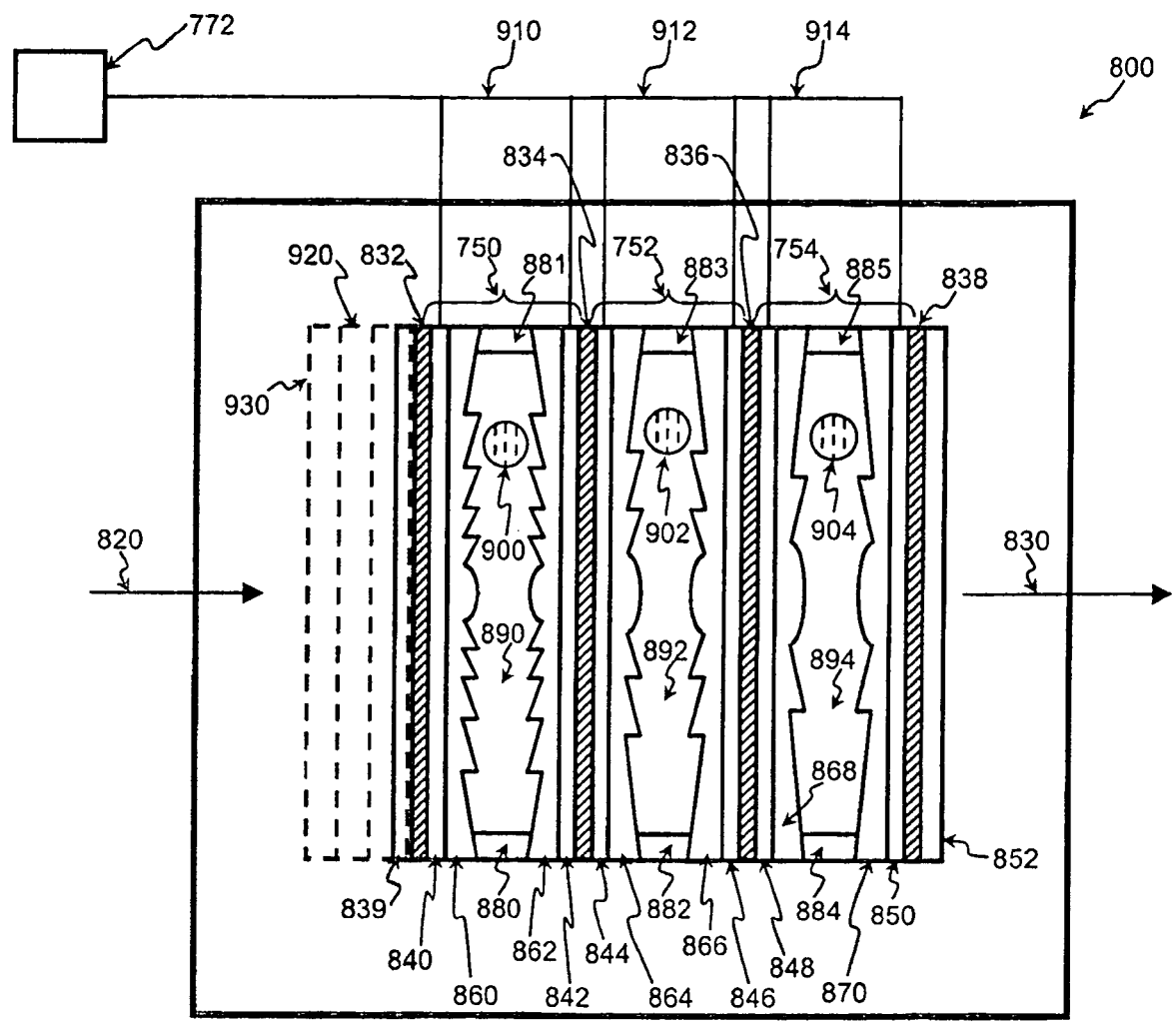
FIG. 4 shows yet another view of a digital focus lens system.

Referring now to FIG. 4, a stack of switchable elements according to an embodiment of the present invention is shown and indicated generally at 800. Stack 800 includes switchable elements, generally indicated at 750, 752, 754. While three elements 750, 752, 754 are shown, any number may be employed in stack 800. Elements 750, 752, 754 may each include a liquid crystal lens interposed between substrates 832, 834, 836, 838. Substrates 832, 834, 836, 838 are at least partially transparent to light 820, 830 transmitted through stack 800. Substrates 832, 834, 836, 838 may comprise glass, plastic, acrylic resin, polymer, crystal, thin films or other materials known to provide a structure for layered electro-optic devices. Substrates 832, 834, 836, 838 each have a first substrate surface and a second substrate surface 839 and 840, 842 and 844, 846 and 848, 850 and 852, respectively. At least a portion of substrate surfaces 839, 840, 842, 844, 846, 848, 850, 852 can include an antireflection coating as may be desirable for minimizing the loss of light 820, 830 transmitted through stack 800. At least a portion of substrate surfaces 840, 842, 844, 846, 848, 850 are deposited with a generally transparent electrical conductors such as indium tin oxide or conducting polymer. Deposited on the conductive substrate surfaces 840, 842, 844, 846, 848, 850 are lens function layers 860, 862, 864, 866, 868, 870. Lens function layers 860, 862, 864, 866, 868, 870 may consist of materials that may patterned and include without limitation polymer, epoxy, polymer-dispersed liquid crystal, poly (methyl methacrylate) (PMMA) or photoresist. Lens function layers 860, 862, 864, 866, 868, 870 are at least partially transparent to light 820, 830 transmitted through stack 800. A portion of the lens function layers 860, 862, 864, 866, 868, 870 also are patterned such that the thickness, index of refraction, transmittance, scattering, absorption or other optical property of each layer spatially varies, and, in turn, may perform a phase, amplitude and/or frequency modifying function on light transmitted through the layers. Lens function layers 860, 862, 864, 866, 868, 870 may be patterned using techniques that include without limitation as optical lithography, electron-beam lithography, UV light exposure, holographic, laser or other interferometry, or contact pattern transfer from a patterned substrate to a portion of the lens function layers. Preferably, lens function layers 860, 862, 864, 866, 868, 870 are patterned with a lens function including without limitation, the optical properties of lenses such as thin, thick, Fresnel, concave, convex, binary, diffracting, aspheric, on-axis, off-axis, cylindrical, holographic and other lenses. Lens function layers 860, 862, 864, 866, 868, 870 may also include alignment grooves or additional alignment layers to provide a desired orientation or alignment of liquid crystal monomers. Lens function layers 860, 862, 864, 866, 868, 870 are preferably separated by spacers 880, 881, 882, 883, 884, 885. Spacers 880, 881, 882, 883, 884, 885 serve to provide cells 890, 892, 894 between adjacent pairs of layers 860, 862, 864, 866, 868, 870, and may comprise such materials as Mylar, photoresist, glass fiber, glass or plastic spheres or other films or materials of generally uniform or controlled thickness. At least a portion of cells 890, 892, 894 are filled with liquid crystal fluid 900, 902, 904. Liquid crystal 900, 902, 904 may include without limitation one or more of a liquid crystal material, liquid crystal, doped liquid crystal, doped liquid crystal material, a nematic liquid crystal, a nematic liquid crystal material, a smectic liquid crystal, a smectic liquid crystal material, a ferroelectric liquid crystal, a ferroelectric liquid crystal material or a polymer dispersed liquid crystal material. Conductor surfaces 840, 842, 844, 846, 848, 850 are connected to control cables 910, 912, 914. Control cables 910, 912, 914 are connected to controller 772. Controller 772 provides voltage to control cables 910, 912, 914 and provides electric fields across pairs of conducting surfaces 840, 842, 844, 846, 848, 850 which control the molecular orientation of liquid crystal 900, 902, 904.

By way of example, switchable elements 750, 752, 754 may be configured similar to conventional nematic liquid crystal cells having parallel homogeneous alignment. Considering element 750 when no electric field is applied across conducting surfaces 840, 842, molecules of liquid crystal 900 are aligned such there exists a first refractive-index mismatch between liquid crystal 900 and layers 860, 862. This first refractive-index mismatch results in element 750 having a first focal length (0-state focal length) for light 820 of a specific polarization. In the presence of an electric field across conducting surfaces 840, 842, molecules of liquid crystal 900 are aligned such there exists a second refractive-index mismatch between liquid crystal 900 and layers 860, 862. This second refractive-index mismatch results in element 750 having a second focal length (1-state focal length) for light 820 of a specific polarization. Similarly, element 752 will have a 0-state focal length with no electric field applied across conducting surfaces 844, 846, and will have a 1-state focal length in the presence of an electric field. Likewise, element 754 will have a 0-state focal length with no electric field applied across conducting surfaces 848, 850, and will have a 1-state focal length in the presence of an electric field. Additional switchable elements 920 may be included in stack 800. Alternately, the 0-state and 1-state focal lengths Nay correspond to the presence and absence of electric fields, respectively. The relationship between the state of focal length and the absence, or presence, of the applied electric field may depend on factors including without limitation, orientation of alignment grooves, types of liquid crystal, refractive indexes of lens function layers, the amplitude, frequency and direction of displacement fields in the liquid crystal, amplitude and frequency of applied electric fields and voltage potentials across the cells and the polarization of light 820. Additional elements 920 may include without limitation liquid crystal lenses similar to those described above, polarizers, liquid crystal—or other—variable apertures or field stops, tunable color filters, variable polarization rotators and retarders, deformable mirrors and MEMS devices. Further, additional non-switchable elements 760 may be included in stack 800. Preferably, 0-state focal lengths of each of elements 750, 752, 754 will be approximately infinity; this may be accomplished, for example, when the lens function layers 860, 862, 864, 866, 868, 870 are generally index-matched to the extra-ordinary index of the corresponding liquid crystal 900, 902, 904. Alternatively, switchable elements 750, 752, 754 may be configured similar to other liquid crystal configurations, including without limitation twisted or super-twisted nematic liquid crystal cells whereby the focusing properties of the switchable lenses are generally-independent of the polarization of the light 820.

Preferably, 1-state focal lengths of each of elements 750, 752, 754 will follow relationships similar to the $2^n$ relationships described in Eq. 5 above. For example, the 0-state focal lengths of elements 750, 752, 754 may all be infinite. However, elements 750, 752, 754 may have 1-state focal lengths with values of $\Delta_m/2^0$, $\Delta_m/2^1$ and $\Delta_m/2^2$, respectively, where $\Delta_m$ is a constant having the dimension of length. It follows that, in the present example, $\Delta_m$ may be equal to the 1-state focal length of element 750 ($f_{m,0}^1$). In this fashion, elements 750, 752, 754 may have 1-state focal lengths of $f_{m,0}^1$, $f_{m,0}^1/2$, $f_{m,0}^1/4$, respectively.

Figure 5:
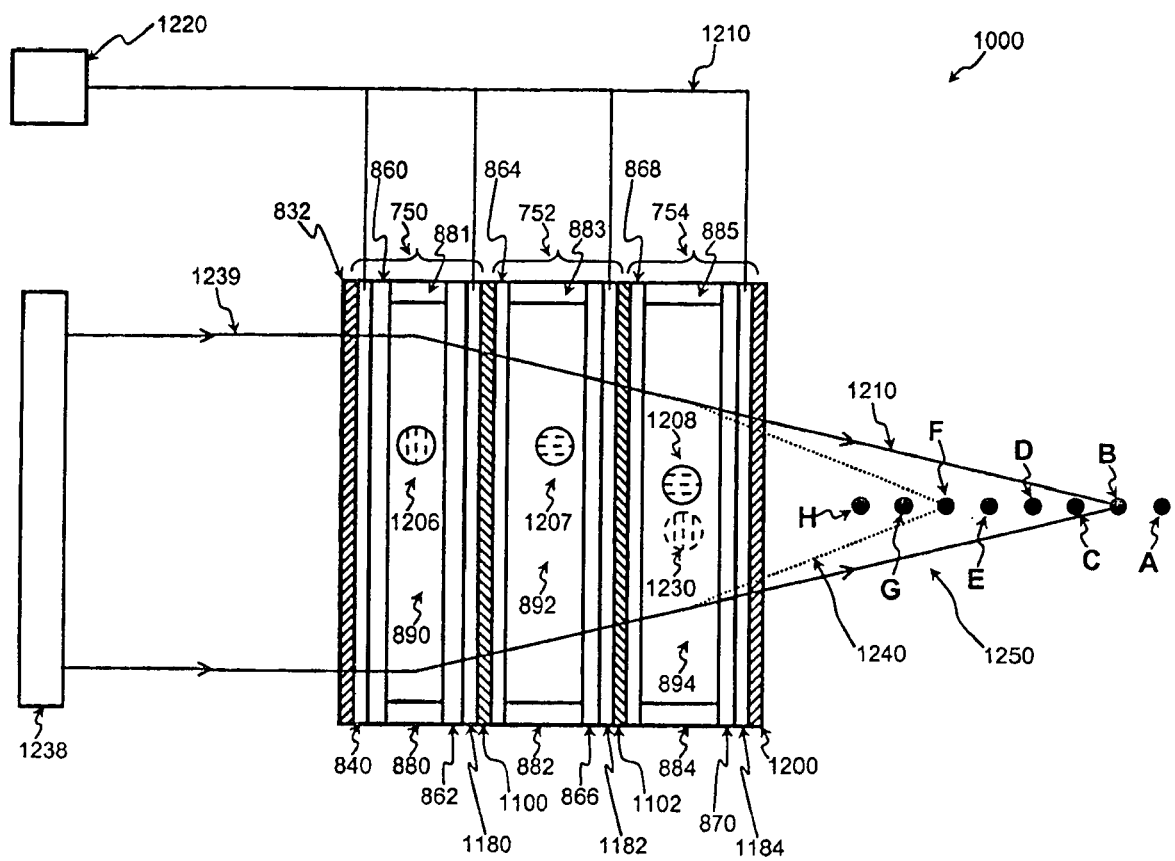
FIG. 5 shows another embodiment of a digital focus lens system.

Turning now to FIG. 5, an alternative embodiment of the stack of switchable elements is shown and generally indicated at 1000. The same components as in FIG. 4 have the same assigned number as in FIG. 4. Stack 1000 includes a plurality of switchable elements, indicated generally at 750, 752, 754. A first transparent substrate 832 has a first conductive surface 840 that is at least partially coated with an optically transparent, electrically conductive layer such as indium tin oxide. Conductive surface 840 is at least partially deposited with a first lens function layer 860. First lens function layer 860 may have a number of optical phase- and/or amplitude-modifying functions embedded in it. Additionally, first lens function layer 860 may have alignment grooves or features for providing liquid crystal monomer alignment. First spacers 880, 881 are deposited on first lens function layer 860 and have a controlled thickness. Second lens function layer 862 is deposited on spacers 880, 881 thereby forming a first cell 890. Second lens function layer 862 may also have a number of optical phase- and/or amplitude-modifying functions imbedded in it. Second lens function layer 862 is deposited on a second conductive surface 1180. Second conductive surface 1180 is deposited on a first transparent film 1100. First transparent film 1100 may be comprised of optically transparent materials including without limitation glass, vinyl-acetate, thin coat sputtered- or evaporated-films, plastic or polymer. First transparent film 1100 may include an optical phase- and/or amplitude-modifying function, such as a lens function, imbedded in it. A third lens function layer 864 is deposited on first transparent film 1100. Third lens function layer 864 may include a number of optical phase- and/or amplitude-modifying functions imbedded in it. Second spacers 882, 883 are deposited on third polymer layer 864.

A fourth lens function layer 866 is deposited on second spacers 882, 883 thereby forming a second cell 892. Fourth lens function layer 866 may include a number of optical phase- and/or amplitude-modifying functions. Fourth lens function layer 866 is deposited on a third conductive surface 1182. Third conductive surface 1182 is deposited on a second transparent film 1102. Second transparent film 1102 may be comprised of optically transparent materials including without limitation glass, vinyl-acetate, plastic or polymer. Second transparent film 1102 may include an optical phase modifying function imbedded in it. A fifth lens function layer 868 is deposited on second transparent film 1102. Fifth lens function layer 868 may include a number of optical phase- and/or amplitude-modifying functions. Third spacers 884, 885 are deposited on fifth polymer layer 868. A sixth lens function layer 870 is deposited on third spacers 884, 885 thereby forming a third cell 894. Sixth lens function layer 870 may include a number of optical phase- and/or amplitude-modifying functions imbedded in it. Sixth polymer layer 870 is deposited on a fourth conductive surface 1184. Fourth conductive surface 1184 is deposited on a second transparent substrate 1200. Liquid crystal material 1206, 1207, 1208 is deposited in cells 890, 892, 894, respectively. Liquid crystal may include one or more of a liquid crystal material, liquid crystal, doped liquid crystal, doped liquid crystal material, a nematic liquid crystal, a nematic liquid crystal material, a smectic liquid crystal, a smectic liquid crystal material, a ferroelectric liquid crystal, or a ferroelectric liquid crystal material.

Conductor surfaces 840, 1180, 1182, 1184 are connected to control cables indicated generally at 1210. Control cables 1210 are connected to controller 1220. Second conducting surface 1180 functions as a common electrode to switchable elements 750 and 752. Likewise, third conducting surface 1182 functions as a common electrode to switchable elements 752 and 754. Controller 1220 provides voltages to control cables 1210 such that electric fields formed across elements 750, 752, 754 are of appropriate modulation, amplitude and sign such that the liquid crystal monomers in cells 890, 892, 894, become aligned to desired orientations. In this fashion, switchable elements 750, 752, 754 function as independently switchable lenses. Also, in this fashion, any number of similar switchable elements may be incorporated in stack 1000.

Preferably the thickness of the optical components in between first substrate 832 and second substrate 1200 is of appropriate thickness, relative to parameters such as the numerical apertures of the lens functions of switchable elements, and the wavelengths of light transmitted through stack 1000, such that the thin-lens-close-contact approximations, known in the field of geometric optics, can be applied. For example, with no electric field applied across conducting surfaces 1180, 1182 and no electric field applied across surfaces 1182, 1184, switchable elements 752, 754 are in the 0-states, and hence may function as lenses having infinite focal lengths. With the proper electric field applied across conducting surfaces 840, 1180, switchable element 750 is switched to the 1-state, and hence may function as a lens having a finite focal length, of, for example, $f_{m,0}^1$. In this fashion, light 1210 emitted from light source 1238, and is transmitted through stack 1000, will be focused at a point B. Under these same conditions, but with an electric field now also applied across conducting surfaces 1182, 1184, liquid crystal monomers 1230 become aligned such that switchable element 754 is switched to the 1-state, and hence may function as a lens having a finite focal length, of, for example, $f_{m,0}^1/4$. In this fashion, for example, light input light indicated at 1239 is emitted from light source 1238. Input light 1239 is transmitted through stack 1000 and is transmitted as light generally indicated as 1250. In this fashion transmitted light 1250 may therefore be redirected by switchable elements 750, 754, and may be focused at a point F. Generally, in this fashion, for the various combinations of states for the three switchable elements 750, 752, 754, given in this example, transmitted light 1250 may be focused at focal points indicated at A, B, C, D, E, F, G, and H.

Alternatively, some or all of switchable elements 750, 752, 754 may be configured such that, with appropriate applied voltages, the focal lengths may be continuously tunable instead of being selectable for a discrete set of focal lengths. For example, such continuously tunable configurations may include without limitation nematic liquid crystal cells in parallel homogeneous alignment and electro-optic lenses.

Alternatively, focal points A, B, C, D, E, F, G, and H may comprise focal planes whereby the transmitted light 1250 forms a virtual or real image at focal planes A, B, C, D, E, F, G, and H. While only three switchable elements 750, 752, 754 are described here, any number of N switchable elements may be incorporated in embodiments of the present invention. In this fashion, the number of selectable focal points may increase proportionally with the function $2^N$.

Figure 6:
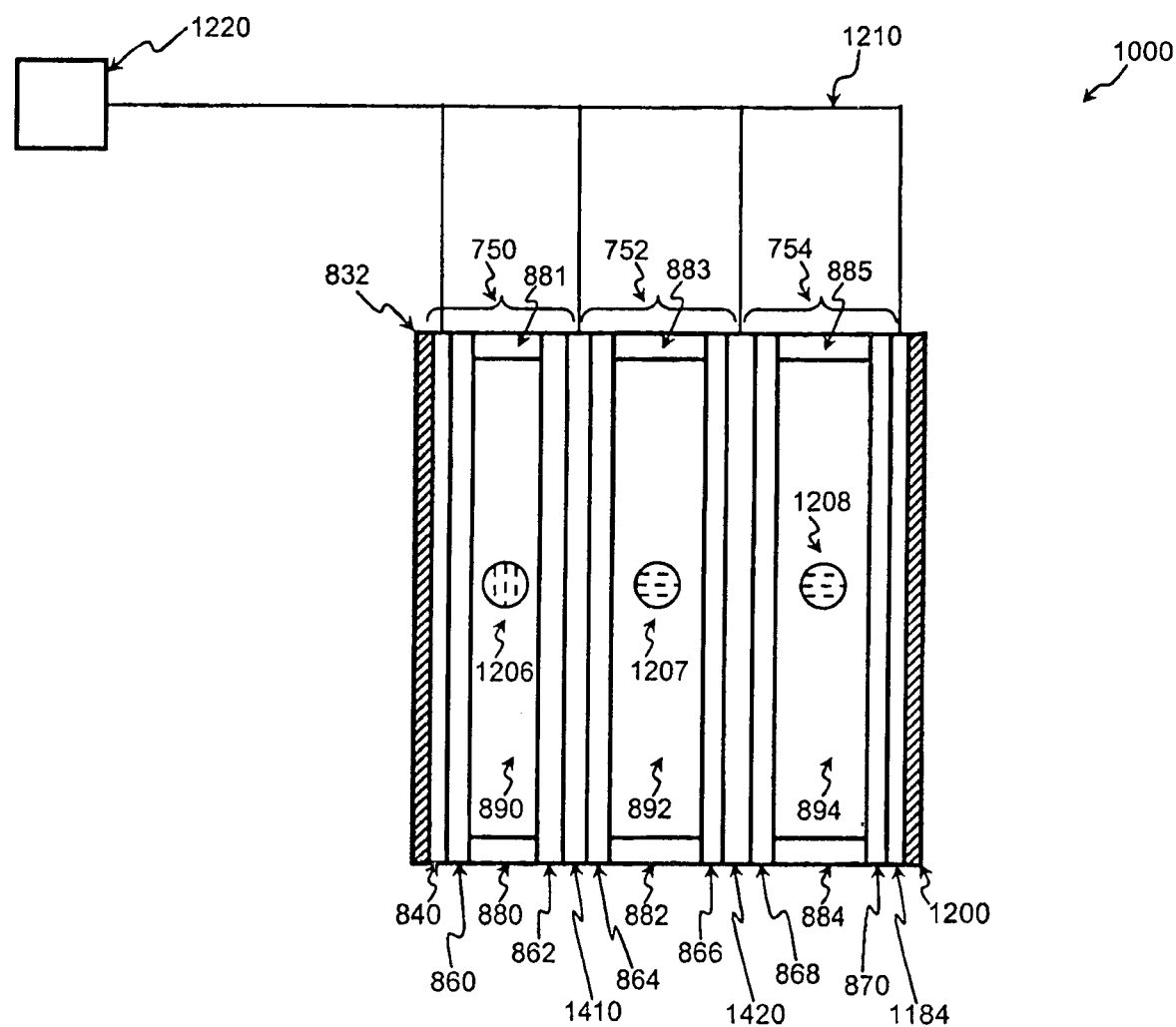
FIG. 6 shows yet another embodiment of a digital focus lens system.

Turning now to FIG. 6, an alternative embodiment of the stack of switchable elements is shown and generally indicated at 1000'. The same components as in FIG. 5 have the same assigned number as in FIG. 5. Stack 1000 includes a plurality of switchable elements, indicated generally at 750, 752, 754. A first transparent substrate (first substrate) 832 has a first optically transparent, electrically conductive surface 840. First conductive surface 840 is at least partially deposited with a first lens function layer 860. First lens function layer 860 has an optical phase- and/or amplitude-modifying function, such as a lens, prism, grating, or other optical function, imbedded in it and may include without limitation materials such polymer, epoxy, PMMA and photoresist.

First spacers 880, 881 are deposited on lens function layer 860 and have a controlled thickness. A second lens function layer 862 is deposited on spacers 880, 881 thereby forming a first cell 890. Second lens function layer 862 is deposited on a first electrically conductive substrate 1410. First electrically conductive substrate (first conductive substrate) 1410 provides both electrical conductivity and structural support to element 750 and to stack 1400 in general. A third lens function layer 864 is deposited on first conductive substrate 1410. Second spacers 882, 883 are deposited on third lens function layer 864.

A fourth lens function layer 866 is deposited on second spacers 882, 883 thereby forming a second cell 892. Fourth lens function layer 866 is deposited on a second electrically conductive substrate 1420. Second electrically conductive substrate (second conductive substrate) 1420 provides both electrical conductivity and structural support to element 752 and to stack 1400 in general. A fifth lens function layer 868 is deposited on second conductive substrate 1420. Third spacers 884, 885 are deposited on fifth layer 868. A sixth lens function layer 870 is deposited on third spacers 884, 885 thereby forming a third cell 894. Sixth lens function layer 870 is deposited on a second conductive surface 1184. Fourth conductive surface 1184 may be deposited on a second transparent substrate (second substrate) 1200. Generally, in a similar fashion, first substrate 832 may be at least partially electrically conductive, such that first substrate 832 and first conductive surface 840 may be combined into a single substrate (not shown). Likewise, second substrate 1200 may be at least partially electrically conductive, such that second substrate 1200 and second conductive surface 1184 may be combined into a single substrate (not shown). Liquid crystal material 1206, 1207, 1208 is deposited in cells 890, 892, 894, respectively. Conductive surfaces (and conductive substrates) 840, 1410, 1420, 1184 are connected to control cables indicated generally at 1210. Control cables 1210 are connected to controller 1220. Alternatively, a portion of lens function layers 860, 862, 864, 866, 868, 870 may include a partially conductive surface (not shown) or may be coated with a conducting film (not shown) such that the conducting surface or film is in near contact with a portion of the liquid crystal material 1206, 1207, 1208. Additionally, a portion of lens function layers 860, 862, 864, 866, 868, 870 may have alignment grooves, coatings or features for providing liquid crystal monomer alignment.

Figure 7A:
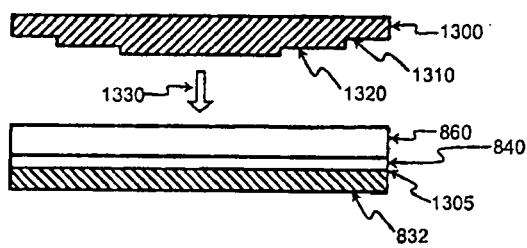
FIGS. 7A–7D are a sequence of cross-sectional schematic diagrams that illustrate a method for fabricating the switchable elements of a digital focus lens system according to an embodiment of the invention.

Turning now to FIGS. 7a–7d, a die-stamping replication method for fabricating the portions of the switchable elements, specifically, the layered structure that includes a substrate, a conductive layer and a lens function layer. The same components as in FIG. 4 have the same assigned number as in FIG. 4. As shown in FIG. 7a, a transparent substrate 832 has a first substrate surface 1305. First substrate surface 1305 has deposited on it an optically transparent, electrically conductive surface (or, conductive layer) 840 such as ITO. Conductive layer 840 may be deposited by sputtering or by other known techniques. Deposited on conductive layer 840 is a lens function layer 860. Lens function layer 860 may include patternable materials including without limitation polymer, epoxy, photoresist or PMMA. Lens function layer 860 may be spin-coated on conductive layer 840. Lens function layer 860 may deposited in such a fashion as to have a generally uniform thickness, yet will be soft or viscous for a period of time before it is hardened by baking, exposure to ultraviolet (UV) light or other hardening processes. A die substrate 1300, is comprised of substrate material that is capable of being patterned or micromachined, including without limitation, glass, plastic, silicon or other substrate materials. Die substrate 1300 has a first die surface 1310. First die surface 1310 is has a spatially-varying thickness pattern 1320. While lens function layer 860 is in its soft or viscous state, die substrate 1300 is brought toward it, indicated schematically by an arrow 1330.

Figure 7B:
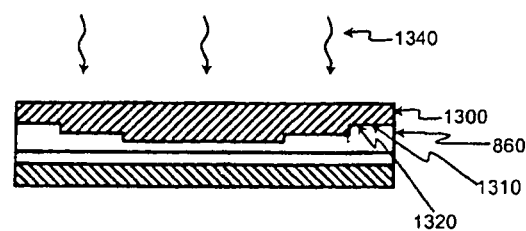
Figure 7C:
Figure 7D:
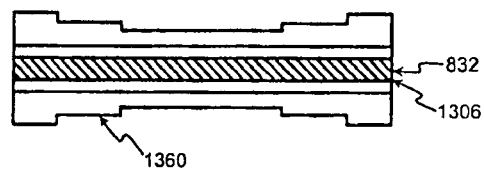

Now referring to FIG. 7b, die substrate 1300 is brought into contact with lens function layer 860. In this fashion, first die surface 1310 is stamped (FIG. 7b) onto phase modifying layer 860 so as to transfer an inverse-copy of spatially-varying thickness pattern 1320 into lens function layer 860. A release agent (not shown), such a silicone spray, may be deposited on one or more of the first die surface 1310 and the lens function layer 860. The release agent may serve to assist in release the of the die substrate 1300 from the lens function layer 860 in later steps of the process. This arrangement is then subjected to a hardening force 1340, such as heat that emanates from a heat source (not shown), or from UV light emanating from a UV source (not shown). Hardening force 1340 serves to harden the lens function layer 860. Now referring to FIG. 7c, after lens function layer 860 has been sufficiently hardened, die substrate 1300 (not shown) is removed. Lens function layer 860 will now have stamped into it an inverse-copy of spatially-varying thickness pattern 1350. With appropriate die, lens function layer 860 can perform phase-modifying functions such as lens functions and other functions including refraction, diffraction, reflection and scattering. Now turning to FIG. 7d, this method can be generally repeated using a second substrate surface 1306 of substrate 832, or using a plurality of substrates (not shown). In this fashion, a second lens function layer 1360, or a plurality of lens function layers (not shown) can be patterned, each its own specific phase- and/or amplitude-modifying properties.

Figure 8:
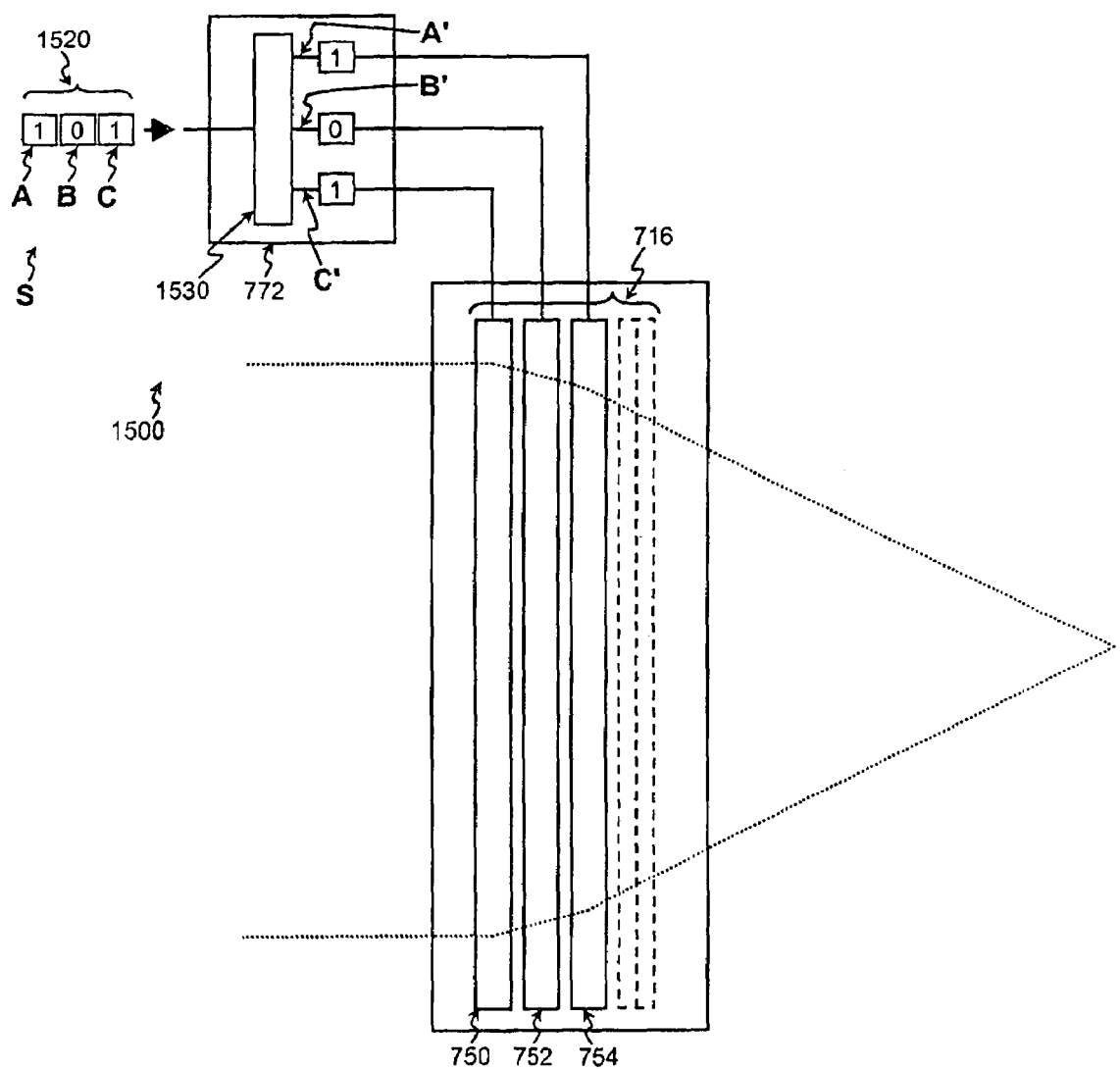
FIG. 8 shows schematic diagram illustrating a method of controlling a digital focus lens system according to an embodiment of the invention.

Referring now to FIG. 8, a method for controlling the states of the switchable elements of embodiments of the present invention is shown and generally indicated at 1500. The same components as in FIG. 3 have the same assigned number as in FIG. 3. A signal, generally indicated at S, is generated and provided to controller 772. Signal S contains information for controlling the states of switchable elements 750, 752, 754. Signal S may be either generated either internally or externally to controller 772. A portion of signal S includes a serial data stream comprising a control word, indicated generally at 1520. Control word 1520 is digital word having a bit field length of N bits where N may be a number equal to the number of switchable elements 750, 752, 754 in stack 716.

In the current example (FIG. 8), control word 1520 may comprise a 3-bit field length where the bits are generally indicated at A, B, C, and has the base-two value "101". However, in general, control word 1520 can have any bit field length and may be comprised of any number of groups of bits. A demultiplexer 1530 serves to demultiplex control word 1520 whereby each of bits A, B, C are routed to a separate port, indicated generally at A', B', C'. Each port A', B', C' is connected to additional electronics (not shown) including a voltage source (not shown) that are, in turn, connected to a separate switchable element 750, 752, 754. In this fashion, bit A provides a signal for controlling the state of switchable element 750, bit B provides a signal for controlling the state of switchable element 752, and bit C provides a signal for controlling the state of switchable element 754. Thus, control word 1520, serves to control the states (or the, "combination of states") of the switchable elements 750, 752, 754. As was described in FIG. 3, the module focal power (or the state thereof) is a function of the combination of states of the switchable elements. Therefore, the state of the module focal power is a function of the value of control word 1520.

Digital Telescope Lens System

Figure 9:
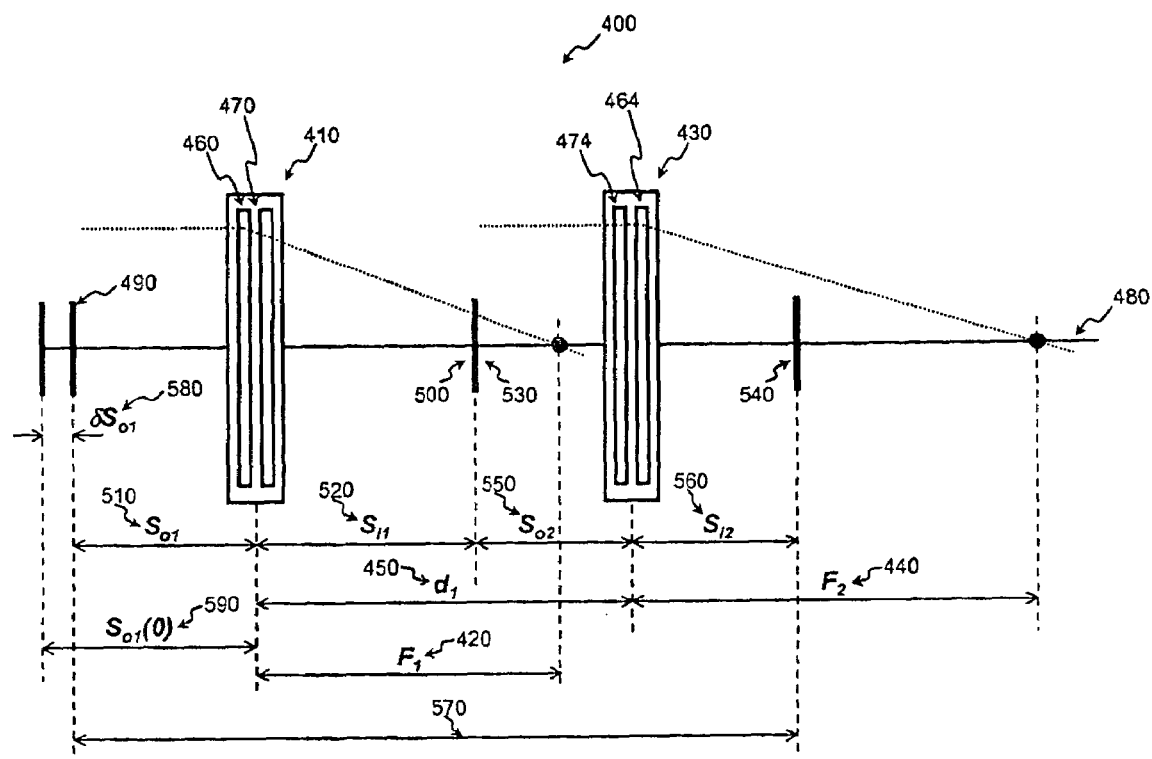
FIG. 9 shows a digital focus lens system incorporated in a digital telescope according to an embodiment of the invention.

Referring now to FIG. 9, the digital focus lens system is applied to a two-lens telescope system. It will be seen that the present embodiment of the invention similar to a simple Galilean telescope having digitally variable focal length, or zoom, properties. A digital zoom lens system (system) 400 incorporates a first module 410 having a first focal length, $F_1$ 420. System 400 further incorporates a second module 430 having a second focal length, $F_2$ 440. Second module 430 is located a first distance, $d_1$ 450, from first module 410. One or more of the first module 410 and second module 430 may incorporate a number of optical elements (elements) 460, 464. One or more of elements 460 may include switchable elements 470, 474 and may be activated into a number of states. The optical axes, generally indicated at 480, of first module 410, second module 430, and elements 460, 470, 474, 464 may be generally collinear. Alternatively, the optical axes of first module 410, second module 430, and elements 460, 470, 474, 464 may be arranged at any relative orientations. In the present embodiment, one or more of elements 470 are similar to thin lenses in close proximity or in contact with one another, and the thin lens and/or the paraxial approximations may apply to portions of first module 410 and/or second module 430.

A first object 490 and a first image 500 are located at distances $s_{o1}$ 510 and $s_{i1}$ 520, respectively, from first module 410. Likewise, a second object 530 and second image 540, are located at distances $s_{o2}$ 550 and $s_{i2}$ 560, respectively, from second module 430. Using the standard lens makers formula, $s_{i1}$ 520 and $s_{i2}$ 560 can be expressed as $$s_{o1} = \left(\frac{1}{F_1} - \frac{1}{s_{i1}}\right)^{-1} \text{ and} \qquad \text{Eq. 22}$$

$$s_{o2} = \left(\frac{1}{F_2} - \frac{1}{s_{i2}}\right)^{-1}. \qquad \text{Eq. 23}$$

Using the definition of $s_{o2}$ 550 similar to that conventionally used in simple two-lens systems $$s_{i1} \equiv d_1 - s_{o2}, \qquad \text{Eq. 24}$$

$s_{o1}$ 510 can be expressed in a form similar to that of common two-lens systems $$s_{o1} = \frac{F_1[s_{i2}(d_1 - F_2) - d_1 F_2]}{s_{i2}(d_1 - F_1 - F_2) + F_2(F_1 - d_1)}. \qquad \text{Eq. 25}$$

A parameter of system 400, the magnification, M, (or, transverse magnification, $M_T$), is similar to the magnification of a simple two-lens system, i.e., $$M \equiv M_T = \frac{-s_{i1}}{s_{o1}} \cdot \frac{-s_{i2}}{s_{o2}}. \qquad \text{Eq. 26}$$

Substituting for $s_{i1}$ 520 and $s_{o2}$ 550, M can now be expressed as $$M = \frac{F_2 F_1}{s_{o1}(d_1 - F_1 - F_1) + F_1(F_2 - d_1)}, \qquad \text{Eq. 27}$$

again, similar to the transverse magnification for standard two-lens systems.

Now, for a zoom lens system such as a telescope or telephoto lens, it may be desirable for $s_{i2}$ 560 to be a generally fixed distance from second module 430 while $s_{o1}$ 510 is variable over a specified range of distances from first module 410. In this fashion, a system focal length 570, given as the distance between $s_{o1}$ 510 and $S_{i2}$ 560, is a variable. However, it is often difficult to construct such a system in which M, $s_{i2}$ 560 and $d_1$ 450 are all constant while $s_{o1}$ 510 is variable. In a present embodiment of the invention, a telescope based on combinatorial optics is enabled in which M, $s_{i2}$ 560 and $d_1$ 450 are constant while $s_{o1}$ 510 is variable.

To accomplish this, for example, $F_1$ 420 may be constant and $F_2$ 440 may be variable and expressed as a function of k, i.e., $F_2(k)$, and given a form similar to that described in Eq. 12, $$F_2(k)|_{k=0,1\ldots 2^N-1} = \left(\frac{N}{f_2^0} + \frac{k}{\Delta_m}\right)^{-1}, \qquad \text{Eq. 28}$$

where, for this example, the 0-states of the N switchable elements 474 of the second module 430 are identical. Substituting Eq. 28 into Eq. 27 gives an expression for M as a function of the variable k, i.e., M(k), $$M(k)|_{k=0,1\ldots 2^N-1} = \frac{\left(-\frac{N}{f_2^0} - \frac{k}{\Delta_m} +\right)}{\left(\left(\frac{d_1 N}{f_2^0} - \frac{f_0^2 \Delta_m - d_1 k f_2^0}{f_2^0 \Delta_m}\right)\frac{1}{F_1}\right)} \qquad \text{Eq. 29}$$
$$s_{i2} + 1 - \frac{d_1}{F_1}.$$

Setting the first derivative of M(k) with respect to k equal to 0, i.e., $$\frac{\partial M(k)}{\partial k} = 0 \qquad \text{Eq. 30}$$

a solution is found for $F_1$ 420

$$F_1 = d_1. \qquad \text{Eq. 31}$$

Substituting Eqs. 31 and 28 into Eq. 25 gives $$s_{o1(k)} = \left(\frac{-k}{\Delta_m} + \frac{1}{s_{i2}} - \frac{N}{f_2^0}\right) d_1^2 + d_1. \qquad \text{Eq. 32}$$

Substituting Eq. 31 into Eq. 29, gives and M as constant, $$M = -\frac{s_{i2}}{d_1}. \qquad \text{Eq. 33}$$

An object separation constant, $\delta s_{o1}$ 580, having the dimension of length, can be defined as the derivative of $s_{o1}$ 510 with respect to k, i.e., $$\delta s_{o1} \equiv \frac{\partial s_{o1(k)}}{\partial k} = -\frac{d_1^2}{\Delta_m}. \qquad \text{Eq. 34}$$

An initial object plane $s_{o1(0)}$ 590, i.e., the value of $s_{o1(k)}$ for k=0, can be expressed as $$\delta_{o1(0)} = d_1 - \frac{N d_1^2}{f_2^0} + \frac{d_1^2}{s_{i2}}. \qquad \text{Eq. 35}$$

Substituting Eqs. 34 and 35 into Eq. 32 gives $$s_{o1}(k)|_{k=0,1\ldots 2^N-1} = s_{o1(0)} + \delta s_{o1} k. \qquad \text{Eq. 36}$$

and in expanded form $$s_{o1} \in \{(s_{o1(0)}), (s_{o1(0)} + \delta s_{o1}) \ldots (s_{o1(0)} + \delta s_{o1}[2^N - 1])\}. \qquad \text{Eq. 37}$$

From the above discussion, it can be seen that the present embodiment of the invention is similar to a telescope with quantized or "digital" zoom control of the focal length. In particular, system 400 is similar to a Galilean telescope, wherein: $F_1$ 420 and $F_2$ 440 are similar to the field lens and ocular lens, respectively; wherein $d_1$ 450 is similar to the distance separating $F_1$ 420 and $F_2$ 440; and wherein M, $s_{o1}$ 510 and $s_{i2}$ 560 are similar to the transverse magnification, object distance and image distance, respectively. However, the present embodiment of the invention has the following distinctive properties: $s_{o1}$ 510 is selectable from a set of quantized locations relative to the location of $F_1$ 420; the relative locations of $F_1$ 420 and $F_2$ 440 may be fixed such that $d_1$ 450 may have a constant value for all object distances in the set of $s_{o1}$; $s_{i2}$ 560 and M may both have constant values for all object distances in the set of $s_{o1}$; and the system and its components may be solid state, i.e., comprise no moving parts.

Digital Camera Lens System

In cases where $s_{i2}$ has a negative value, the image formed by the system is a virtual image and the system can function similarly to simple two-lens telescope. In this fashion, remote objects may be viewable by the human eye and may not require additional optical elements for viewing such as oculars. However, when $s_{i2}$ has a positive value, the image formed by the system is a real image and the system may function as an imaging system such as a camera. For example, the system may function as a camera wherein an image sensor (sensor) may be positioned a distance $s_{i2}$ from $F_2$. Such sensors may include, without limitation, CCD arrays, CMOS image sensors or sensor arrays, artificial retinas or conventional photographic film. In this fashion, information, pertaining to the image of an object located at a distance $s_{o1}$ from $F_1$, may be captured by the sensor.

Additional optical elements may be in incorporated in all embodiments of the invention in fashions similar to those used commonly in telescopes, cameras and other imaging and non-imaging systems or in other ways that will be understood by those skilled in the art. Examples of such additional optical elements may include without limitation oculars, field lenses, and apertures, stops, partially- or fully-reflective mirrors, prisms, gratings, lenses, and lens complexes.

Digital Projector Lens System

In another embodiment of the present invention, the system may be configured to function as an image projector. For example, with 2-lens image projectors, generally, an object is located at a distance, $s_{o1}$, from an object lens, $L_1$; an image is formed at a distance, $s_{i2}$, from an image lens $L_2$; and $L_1$ and $L_2$ are separated by a distance $d_1$. Similarly to telescopes, for image projectors it is sometimes desirable for both the separation distance between the two optical elements $d_1$ and the magnification M to have constant values. In the previous preferred embodiment of a digital telescope lens system, $s_{i2}$ was held constant while $s_{o1}$ was variable. However, for the present embodiment of a digital projector lens system, it may be desirable that $s_{i2}$, be variable while $s_{o1}$ is held constant. To accomplish this functionality, the previous embodiment of the invention is utilized, however, the system may now be flipped relative to the positions of the object and the image. In this fashion, the $F_2$, may be left constant and $F_1$, may now be variable and expressed as a function of the variable k, and given a form similar to that described above and in Eq. 12.

Digital Microscope Lens System

The above discussions described embodiments of the invention that utilize digital focus lens systems for purposes that include the controlling of the position of an image without requiring changes in the magnification of the image, and while simultaneously allowing the system to be solid state. Similarly, however, it may also sometimes be desirable for the system to exhibit properties such as allowing the control of the magnification of an image without requiring changes in the location of the image, and while simultaneously allowing the system to be solid state.

For example, for microscopes in general, and specifically for 3-lens microscopes, an object may be located at a distance, $s_{o1}$, from a first module. A second module may be located at a first distance $d_1$ from the first module. A third module may be located at a second distance $d_2$ from the second module. An image may then be formed at an image distance $s_{i3}$ from the third module. In the present embodiment of a 3-lens microscope, it may be desirable for $d_1$, $d_2$, $s_{o1}$, and $s_{i3}$ to all have generally constant values, while it may also be desirable that the magnification, M, may be variable.

In the previous embodiments, M and $d_1$ were held constant while either $s_{o1}$ or $s_{i2}$ were variable. However, for the present embodiment of a combinatorial optical microscope, the magnification M will now be variable while $s_{o1}$, $s_{i3}$, $d_1$ and $d_2$, will be held generally constant.

One way to accomplish this functionality incorporates the previous embodiment of the invention, a digital projector lens system and a third module having variable focal power. As in the previous embodiment, the focal length of the second module $F_2$ may be left constant. Further, the first module may incorporate switchable elements as previously described. In this fashion the focal length of the first module $F_1$ may be variable and expressed as a function of k, and given the form similar to that described in Eq. 12.

A solution may be found for which the first derivative of $s_{i3}$ with respect to k is equal to zero, i.e., $$\frac{\partial s_{i3}}{\partial k} = 0.$$

In this fashion, the distance of the image to the third module will be a constant and independent of the state of variable k. One possible solution to the above condition exists for the case when the focal power of at least one of the modules is continuously variable between two specified values of focal power. The magnification, M, (or, transverse magnification, $M_T$) of this three-module system may also be similar to the magnification of a common three-lens system, similar to the previous discussion of M for a two-module system, $$M \equiv M_T = \frac{-s_{i1}}{s_{o1}} \cdot \frac{-s_{i2}}{s_{o2}} \cdot \frac{-s_{i3}}{s_{o3}}.$$

The desired functionality of M being a variable function of k, M(k), can be achieved for a system utilizing a module, for example, the third module, the focal length, $F_3$, of which is a variable function of k. Ways to achieve this functionality include without limitation the use of electro-optic or liquid crystal lenses or other variable or switchable optical elements that have generally continuously variable focal power. For example, for a material having an $r_{33}$ or other electro-optic coefficient, such as lithium niobate, may be polished in the form of a lens. Transparent electrodes, such as indium tin oxide, may be deposited on the surfaces of the lens. An electric field may then be applied from one electrode to the other, across the thickness of the lens. Due to the electro-optic coefficient of the material of the lens, the index of the lens will be a function of the strength of the applied electric field. In this fashion, the focal length of the lens will also be a function of the applied electric field. Similarly, liquid crystal (LC) lenses and gratings, such as modal LCs and LC lenses similar to LC blazed-grating beam deflectors based on nematic LC cells in parallel homogeneous alignment can provide variable focusing of the above form.

It will be understood by those skilled in the art of optics that many additional optical elements, components, complexes, etc., may be included in the present invention; those additional elements have been omitted from this discussion for simplicity.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. The appended claims are not to be interpreted as including means-plus-function limitations, unless such a limitation is explicitly recited in a given claim using the phrase "means for."

What is claimed is:

1. A Digital Focus Lens System for providing an optical system having a plurality of selectable focal powers, comprising:
   a first switchable element capable of being switched between a first-element first-state and a first-element second-state; and
   and a second switchable element capable of being switched between a second-element first-state and a second-element second-state;
   wherein the first and second switchable elements are in optical communication with each other such that each of them may contribute to a cumulative focal power,
   wherein, a first focal power may be selected by activation of the first switchable element to the first-element first-state and activation of the second switchable element to the second-element first-state,
   wherein a second focal power may be selected by activation of the first switchable element to the first-element second-state and activation of the second switchable element to the second-element first-state,
   wherein a third focal power may be selected by activation of the first switchable element to the first-element first-state and activation of the second switchable element to the second-element second-state, and
   wherein a fourth focal power may be selected by activation of the first switchable element to the first-element second-state and activation of the second switchable element to the second-element second-state;
   wherein each of the first, second, third and fourth focal powers is unique,
   wherein the values of the selectable focal powers follow a linear progression such that the difference of the first and second focal powers, the difference of the second and third focal powers, and the difference of third and fourth focal powers are substantially identical.

2. The system according to claim 1 further comprising any number of additional switchable elements.

3. The system according to claim 1 comprising a number n of switchable elements;
   wherein a number $2^n$ distinct focal powers may be selected by the system.

4. The system of claim 1 further comprising a controller for providing control signals that serve to activate the first and second switchable elements.

5. The system according to claim 1 wherein a portion of the switchable elements may be continuously tuned between the focal powers of their respective first- and second-states.

6. The system of claim 1 further comprising one or more light sources for providing light to be transmitted through and modified by the system.

7. The system of claim 6 wherein the light is received and transmitted by the first and second switchable elements and is modified in accordance with the selected focal powers of the first and second switchable elements.

8. The system of claim 7 wherein a portion of the light transmitted by the system forms one or more images.

9. The system according to claim 1 wherein a portion of the switchable elements include liquid crystal lenses.

10. The system according to claim 1 wherein a portion of the switchable elements include switchable holographic optical elements.

11. The system according to claim 1 wherein a portion of the switchable elements include polymer dispersed liquid crystal.

12. The system according to claim 1 wherein a portion of the switchable elements form a lens stack.

13. The system according to claim 1 further comprising one or more non-switchable elements for further modifying the optical properties of the system.

14. The system according to claim 1 wherein a portion of the switchable elements include electro-optic lenses.

15. The system according to claim 1 wherein a portion of the switchable elements include liquid crystal and polymer lenses.

16. The system of claim 1 wherein the digital focus lens system is a digital telescope, telephoto lens, or zoom lens.

17. The system of claim 1 wherein the digital focus lens system is a lens in a digital camera.

18. The system of claim 1 wherein the digital focus lens system is a lens in a digital projector.

19. The system of claim 1 wherein the digital focus lens system is a lens in a digital microscope.

20. A method for controlling a digital lens system having N switchable elements in optical communication with each other such that each of them may contribute to a cumulative focal power, where N is 2 or more, wherein each switchable element is capable of being switched between a first-state and a second-state, the method comprising:
   generating a control signal containing information for controlling the states of each of the N switchable elements; and
   coupling the control signal to the N switchable elements to set the state of each of the N switchable elements,
   wherein a portion of the control signal includes a data stream comprising a control word, wherein N switchable elements are configured such that values of the cumulative focal power follow a linear progression such that the difference successive focal powers are substantially identical.

21. The method of claim 20 wherein the control word is a digital word having a bit field length of N bits.

22. The method of claim 20 wherein the control signal is an electrical signal.

23. The method of claim 20 wherein the control signal is at a voltage, current or frequency appropriate for activating the switchable elements to their desired states.

* * * * *